(12) United States Patent
Laskai et al.

(10) Patent No.: US 6,275,391 B1
(45) Date of Patent: Aug. 14, 2001

(54) COMPACT PUSH-PULL CONVERTER AND CROWBAR CIRCUIT, AND CONTROL THEREFOR

(75) Inventors: Laszlo Laskai; Milan Zarko Ilic, both of Clifton Park, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/615,832

(22) Filed: Jul. 13, 2000

Related U.S. Application Data
(60) Provisional application No. 60/195,552, filed on Apr. 6, 2000.

(51) Int. Cl.[7] .................... H02M 3/335; H02M 7/538; H02H 7/122
(52) U.S. Cl. ................... 363/24; 363/56.06; 363/134
(58) Field of Search ............................. 363/24, 25, 22, 363/56.06, 98, 134

(56) References Cited

U.S. PATENT DOCUMENTS

| | | | |
|---|---|---|---|
| 3,633,094 | * 1/1972 | Clements | 323/236 |
| 3,659,182 | * 4/1972 | Snedeker | 320/165 |
| 3,803,451 | * 4/1974 | Ferrill, Jr. | 315/209 T |
| 4,063,146 | * 12/1977 | Oliver | 323/241 |
| 4,156,895 | * 5/1979 | Brakus et al. | 363/56 |
| 4,366,395 | 12/1982 | Gillard et al. | |
| 4,593,371 | 6/1986 | Grajewski | |
| 5,969,955 | 10/1999 | Laskai et al. | |
| 6,021,051 | 2/2000 | Laskai et al. | |

FOREIGN PATENT DOCUMENTS

| | | |
|---|---|---|
| 1000874 | 11/1976 | (CA) . |
| 2 709 396 | 8/1993 | (FR) . |
| 2 718 599 | 4/1994 | (FR) . |

OTHER PUBLICATIONS

"Syllabus: A Categorical Course in Physics," pp. 59–74—Generators and Tubes in Interventional Radiology, Ernst Ammann; Gunter Wiede, 81st Scientific Assembly and Annual Meeting of the Radiological Society of North America, Nov. 26–Dec. 1, 1995.

"Compact Push–Pull Converter And Crowbar Circuit, and Control Therefor," L. Laskai; MZ Ilic, filed concurrently herewith, Apr. 6, 2000.

* cited by examiner

*Primary Examiner*—Peter S. Wong
*Assistant Examiner*—Bao Q. Vu
(74) *Attorney, Agent, or Firm*—Jill M. Breedlove; Douglas E. Stoner (57) ABSTRACT

A push-pull converter, coupled through an isolation transformer to a crowbar circuit for controlling an isolated output voltage across an output capacitor, has a compact circuit arrangement with a minimal number of components. The switching devices of the push-pull converter have integrated, ultra-fast anti-parallel diodes. The crowbar circuit is a voltage-controlled bi-directional switch coupled between the transformer and the output capacitor. The converter is controlled in an output-voltage-on mode by turning on and off the first switching device, and in an output-voltage-off mode by applying a gating signal to the second switching device sufficient to both activate the crowbar circuit and discharge the output capacitor for very fast isolated output voltage turn-off. In addition, a primary-side circuit comprising a switch and a resistance can be used to avoid excessive residual output voltage build-up.

12 Claims, 7 Drawing Sheets

COMPACT PUSH-PULL CONVERTER AND CROWBAR CIRCUIT, AND CONTROL THEREFOR

CROSS REFERENCE TO RELATED APPLICATIONS

This application claims the benefit of US Provisional Application Ser. No. 60/195,552, filed Apr. 6, 2000.

BACKGROUND OF THE INVENTION

The present invention relates generally to power supplies utilizing transformer isolation and requiring very fast isolated output voltage turn-off, such as may be useful in grid-controlled x-ray tubes, for example.

U.S. Pat. No. 5,969,955 describes a power supply utilizing an isolation transformer including a crowbar circuit and control such that turn-off by discharging an output capacitor is made advantageously faster than conventional circuits. The forward converter has a push-pull arrangement of two switching devices. For operation in the output voltage-on mode, the forward converter transfers energy in a peak forward converter mode with the first switching device being turned on and off. For output voltage turn-off, the crowbar circuit is activated by turning on the second switching device, resulting in a reverse voltage at the secondary winding of the isolation transformer. The reverse voltage is superimposed on the converter output voltage, the sum of the converter output voltage and the reverse voltage being imposed across the crowbar circuit. If the sum of the converter output voltage and the reverse voltage exceeds the breakover voltage of the crowbar circuit, the output capacitor discharges rapidly through the crowbar circuit and the transformer secondary winding.

It is desirable to provide a push-pull circuit arrangement and control that minimizes the number of components in the crowbar circuit, hence providing a more compact and lower cost circuit design. It is furthermore desirable to provide such a circuit and control that maximizes efficiency and reliability.

BRIEF SUMMARY OF THE INVENTION

A push-pull converter, coupled through an isolation transformer to a crowbar circuit for controlling an isolated output voltage across an output capacitor, has a compact circuit arrangement with a minimal number of components. The push-pull converter comprises first and second switching devices having integrated, ultra-fast anti-parallel diodes. The crowbar circuit comprises a trigger device (i.e., a voltage-controlled bi-directional switch) coupled between the transformer and the output capacitor. The converter is controlled in an output-voltage-on mode by turning on and off the first switching device. In an output-voltage-off-mode, the control provides a gating signal to the second switching device sufficient to both activate the crowbar circuit and discharge the output capacitor for very fast isolated output voltage turn-off. In particular, the gating signal provides a pulse of sufficient length to (1) achieve the breakover voltage across the trigger device to activate the crowbar circuit, i.e., in a predetermined time equal to a fraction of the resonant period determined by the leakage inductance and winding capacitance of the transformer, and (2) discharge the output capacitor, i.e., in another predetermined time equal to a fraction of the resonant period determined by the leakage inductance and the output capacitance. In addition, a primary-side circuit comprising a switch and a resistance can be used to avoid excessive residual output voltage build-up after the initial output capacitor discharge.

DETAILED DESCRIPTION OF THE INVENTION

Figure 1:
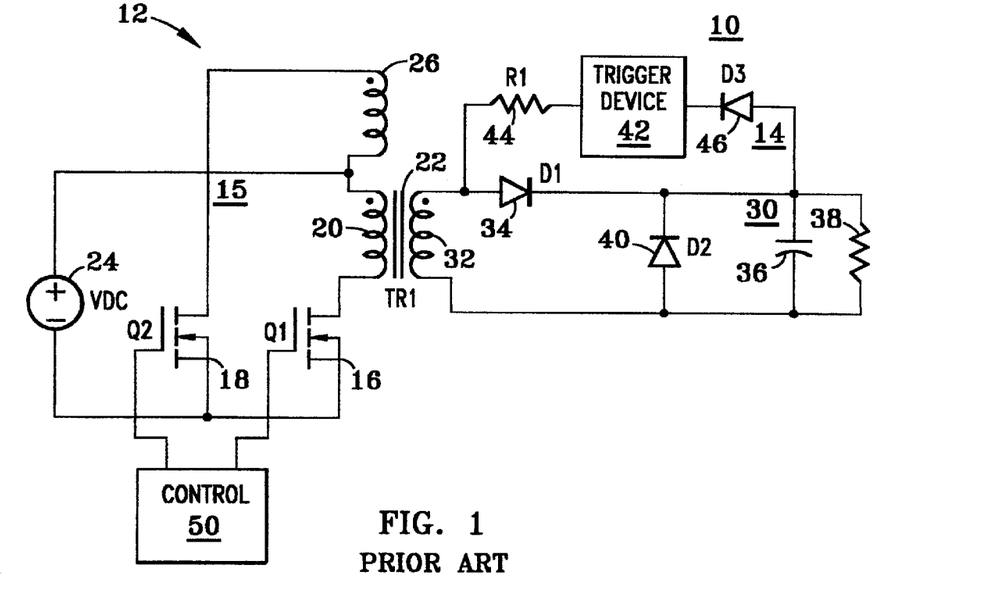
FIG. 1 schematically illustrates a push-pull power converter and control according to U.S. Pat. No. 5,969,955.

FIG. 1 illustrates a push-pull converter with crowbar circuit such as described in U.S. Pat. No. 5,969,955. In particular, FIG. 1 illustrates a circuit 10 comprising a converter 12 and a crowbar circuit 14, suitable as a gridding circuit for an x-ray tube, for example. Converter 12 comprises an input push-pull converter stage 15 with switching devices 16 (Q1) and 18 (Q2). Switching device 16 (Q1) is coupled in series with a primary winding 20 of an isolation transformer 22 (TR1), the series combination of device 16 and winding 20 being connected in parallel across an input voltage supply 24 (Vdc). Switching device 18 (Q2) is connected in series with a secondary (or reset) winding 26 of transformer 22, the series combination of device 18 and winding 26 also being connected in parallel across supply 24. An output stage 30 of forward converter 12 comprises a secondary winding 32 of transformer 22, one terminal of which is connected to the anode of a rectifying diode 34 (D1). The cathode of diode 34 is connected to an output capacitor 36 which is illustrated as being connected in parallel with a resistor 38. Another diode 40 (D2) is connected in parallel with output capacitor 36 such that the cathode of diode 40 is connected to the cathode of diode 34.

The crowbar circuit 14 is coupled across diode 34 (D1). (Crowbar is a term known generally in the art to mean a controlled short-circuit.) The crowbar circuit comprises a trigger device 42, which is shown as being connected in series with a current-limiting resistor 44 (R1) and a diode 46 (D3). The trigger device may comprise a gas discharge tube, for example. Alternatively, the trigger device may comprise any other suitable high-voltage trigger device, such as a SIDAC or a series of SIDAC's, for example. Another suitable alternative for some applications may be a krytron, for example.

In operation, the forward converter provides a voltage step-up function and isolation. Specifically, the forward converter steps up voltage to a predetermined grid voltage which is isolated by transformer 22 and referenced to a cathode potential that is sufficient to turn on and off the x-ray tube current. In one example, the voltage is stepped up from 72V to 3500V.

In the grid-on (or output-voltage-on) mode, power is transferred from the input converter stage 15 to the output converter stage 30 via transformer 22 by turning on and off device Q1 through a control 50. The inherent reverse (or anti-parallel) diode of device Q2 connects the reset winding 26 to ground such that after each input voltage pulse, the core of transformer 22 is reset.

When a grid-off (or output-voltage turn-off) command is generated through control 50, device Q2 is gated on, and a reverse voltage is generated on secondary winding 32. The reverse voltage is superimposed on the converter output voltage such that the sum of the reverse voltage and the converter output voltage is applied across crowbar circuit 14. If the sum of the reverse voltage and the output voltage (i.e., the voltage across the crowbar circuit) is greater than the breakover voltage of the trigger device (e.g., 1000 V), then the output capacitor 36 discharges rapidly (e.g., less than 100 nsec) through the crowbar circuit and transformer secondary winding.

The output impedance of the gridding circuit, i.e., the size of the output capacitor, is limited essentially only by the time required for charging. And because the forward converter provides a direct transfer of energy, this limitation is negligible (e.g., 10–20 psec).

Diode 40 (D2) is provided as a protection against a possible reverse charge build-up on output capacitor 36 when the grid voltage is turned off.

As a first approximation, the output voltage of the gridding circuit is determined by the input voltage and the transformer turns ratio.

The trigger device breakover voltage should be higher than the sum of the output voltage and the reverse voltage that is created by the core reset pulse, but the breakover voltage should be lower than the sum of the output voltage and the reverse voltage generated by the gating of device Q2. During reset of the transformer core, the magnetization energy charges the winding capacitance; hence, the reverse voltage is limited. For example, for a 40 $\mu$H magnetizing inductance and a 20 nF winding capacitance (both referred to the primary), the reverse voltage is approximately 800V. Hence, for a 3500V output voltage, the breakover voltage would be between approximately 4300V and 7000V.

Figure 2:
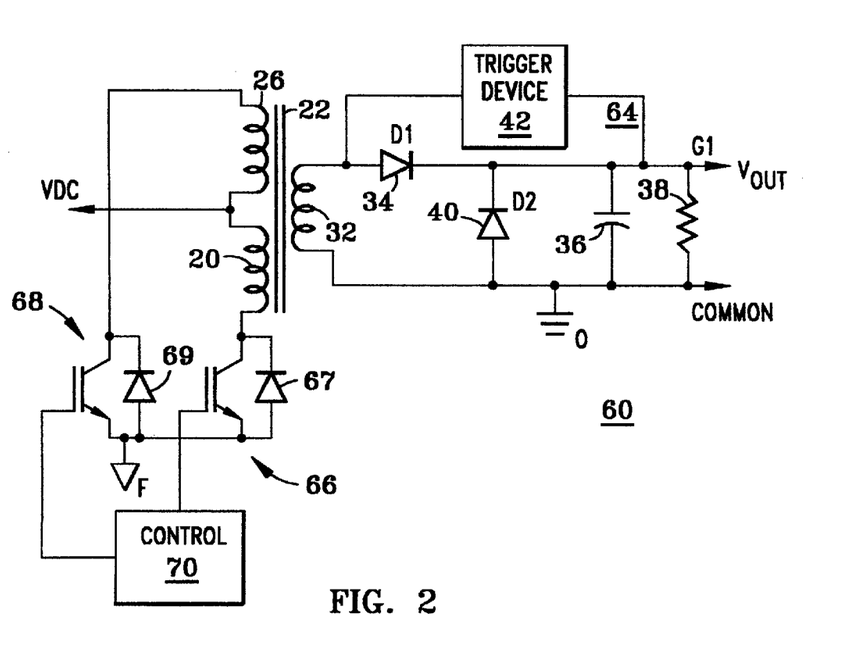
FIG. 2 schematically illustrates a push-pull power converter and control according to an exemplary embodiment of the present invention.

FIG. 2 illustrates an exemplary embodiment of a push-pull circuit 60 and control 70 according to the present invention wherein a very fast isolated output voltage turn-off is achieved with a minimal number of circuit components. In particular, with respect to FIG. 1, high-voltage components (diode D3 and resistor R1) have been eliminated, resulting in crowbar circuit 64. Also, the push-pull converter comprises switching devices 66 and 68 having integrated, ultra-fast anti-parallel diodes 67 and 69, repectively. Switching devices having ultra-fast anti-parallel diodes are typically considered to have reverse diode recovery times of less than or equal to about 50 nanoseconds, for example. Exemplary switching devices 66 and 68 comprise insulated gate bipolar transistors (IGBT's), for example.

Advantageously, an exemplary control 70 according to the present invention enables use of off-the-shelf SIDAC's as trigger device 42, without any additional current limiting element in the crowbar circuit.

For very fast output voltage turn off, switching device 68 is gated on in order to activate the crowbar circuit 64 and to provide a discharge path for the output capacitor 36 by shorting the magnetizing inductance of transformer 22. In particular, the crowbar circuit is activated by achieving the breakover voltage across the trigger device through the superposition of output voltage Vout and the transformer secondary voltage Vsec in a predetermined time equal to a fraction of the resonant period determined by the leakage inductance and winding capacitance of the transformer. Furthermore, the output capacitor is discharged in another predetermined time equal to a fraction of the resonant period determined by the transformer leakage inductance and output capacitance. The length of the gating signal to device 68 is, therefore, the sum of the predetermined times needed to both activate the crowbar circuit and discharge the output capacitor. In an exemplary embodiment, the predetermined time for activating the crowbar circuit is greater than or equal to about one-quarter of the resonant period determined by the leakage inductance and winding capacitance of the transformer; and the predetermined time for discharging the output capacitor is greater than or equal to about one-quarter of the resonant period determined by the leakage inductance and the output capacitance.

Figure 3:
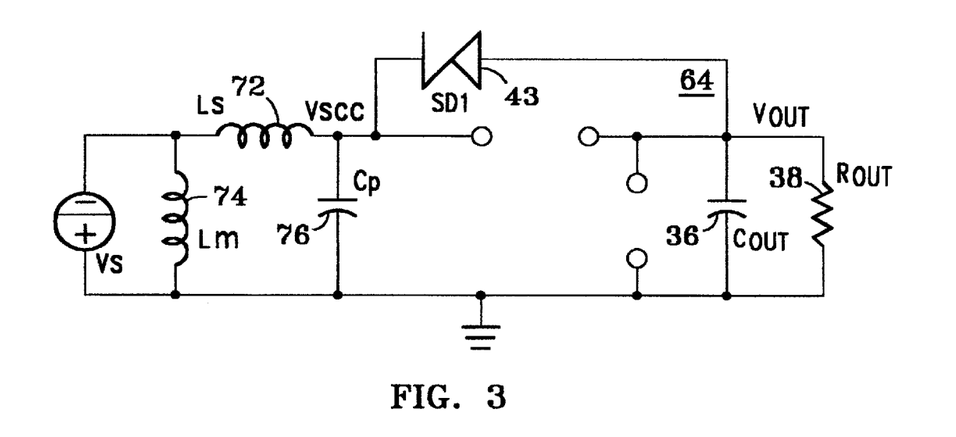
FIG. 3 schematically illustrates an equivalent circuit for the converter of FIG. 2 during the output capacitor discharging process.
Figure 5:
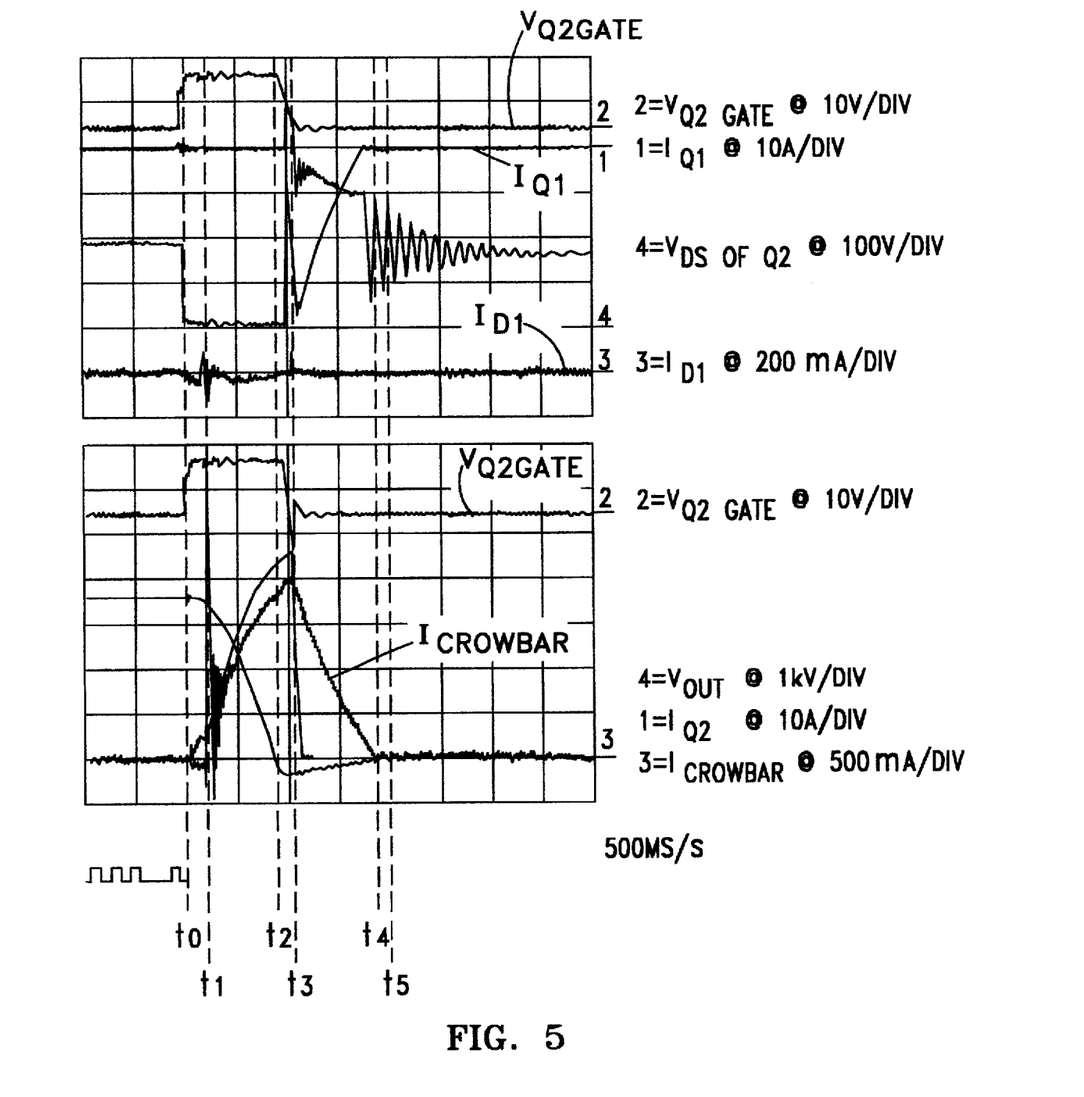
FIG. 5 graphically illustrates operation of an exemplary implementation of the power converter of FIG. 2.

FIG. 3 illustrates the equivalent circuit for the circuit of FIG. 2 during the output capacitor discharging process, i.e., with the crowbar circuit 64 and diode D1 off (i.e., not conducting). The equivalent circuit of FIG. 3 shows the transformer parasitic impedances, i.e., the leakage inductance 72 (Ls), the magnetizing inductance 74 (Lm), and the parasitic capacitance 76 (Cp). FIG. 5 shows exemplary experimental waveforms for operation of the circuit of FIG. 2. By way of illustration, FIG. 3 illustrates the trigger device as comprising a SIDAC or series of SIDAC's 43 (SD1). The output capacitor discharging process starts by turning on device 68 at time t0. While device 68 is on, a negative voltage Vs is generated on the secondary side of the step-up transformer.

During the period t0–t1, a negative voltage Vsec builds up across the parasitic capacitance Cp. The winding capacitance Cp and the leakage inductance Ls form a series resonant circuit. This mode ends as soon as the voltage across the crowbar circuit reaches the breakover voltage at time t1.

Upon triggering the crowbar circuit at time t1, the equivalent circuit is a resonant circuit comprising output capacitor Cout, parasitic inductance Ls, and an equivalent resistance comprising the SIDACS's on-resistance Rsid, the SIDAC's series resistance Rser, and the transformer secondary winding resistance Rsec. The resonant circuit rings until the output voltage drops below zero, and the diode D2 across the output capacitor starts to conduct at instant t2. Switch 68 is turned off at time t2.

If switching device 68 is gated off prematurely, i.e., before time t2, then the remaining charge on the output capacitor discharges through the output resistor Rout. If device 68 is gated off after time t2, then current stress on the circuit components may become excessive either as a consequence of transformer saturation, or due to insufficient current limiting impedance since the maximum current in the discharge path is limited only by the characteristic impedance of the transformer.

After switching device 68 turns off, an RL circuit is formed with diode D2, resistor Rout and inductance Ls, with a positive voltage Vs on the transformer secondary side since the body diode 67 of device 66 (FIG. 2) conducts. The current through the leakage inductance falls to zero at time t4.

Figure 4:
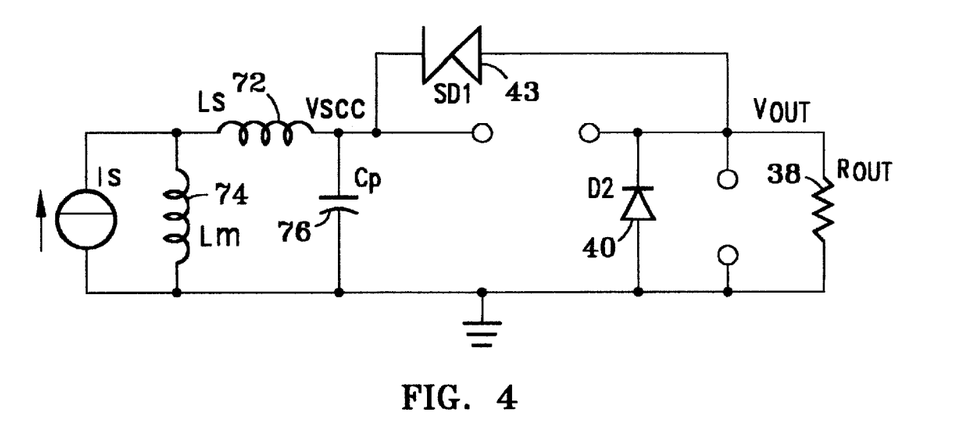
FIG. 4 schematically illustrates an equivalent circuit for the power converter of FIG. 2 during the recovery process of the anti-parallel diode of the first switching device Q1.

As the current through the body diode 67 of device 66 decreases to zero, the body diode goes through a recovery period of t4–t4'. The equivalent circuit is shown in FIG. 4 wherein the diode recovery mode is represented using a current source Is that charges the output capacitor. Advantageously, by using IGBT's with ultrafast, anti-parallel diodes, a significant residual output voltage is avoided that would otherwise exist if MOSFET's with slow-recovery, anti-parallel diodes were used, such as shown in FIG. 1.

After the SIDAC's are turned-off, the energy trapped in the transformer parasitic impedances (magnetizing inductance Lm, leakage inductance Ls, and capacitance Cp) initiates a resonant ring. The output capacitor is charged as a consequence of this resonant ring. The resulting voltage is a function of the transformer parasitic impedances and the SIDAC turnoff time and can be as high as 2% or more of the nominal output voltage, which may be too high for some applications. For example, a typical requirement for x-ray applications is that the output voltage be under 1% of nominal output grid-on voltage.

Figure 6:
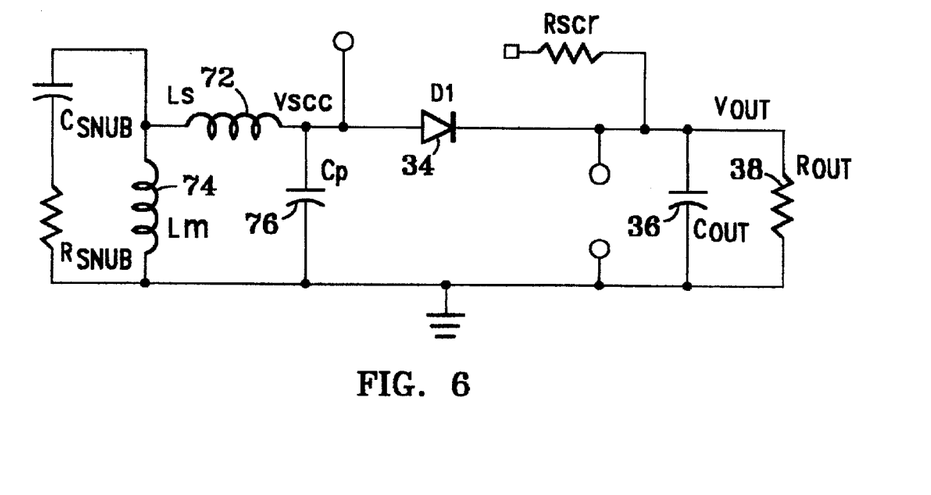
FIG. 6 schematically illustrates an equivalent circuit for the power converter of FIG. 2 after turn off of the trigger device during output voltage build-up due to stored energy in the transformer.

The mechanism of the output voltage build-up can be explained by two resonant processes occurring after SIDAC turn-off. First, an LC resonant circuit is formed by the transformer parasitic impedances (Lm, Ls and Cp). Second, another LC circuit is formed with inductances Lm and Ls in series and capacitances Cp and Cout in parallel. The equivalent circuit is shown in FIG. 6. The energy transferred to the output capacitor discharges through the output resistor Rout at a rate determined by the time constant Rout·Cout.

Figure 7:
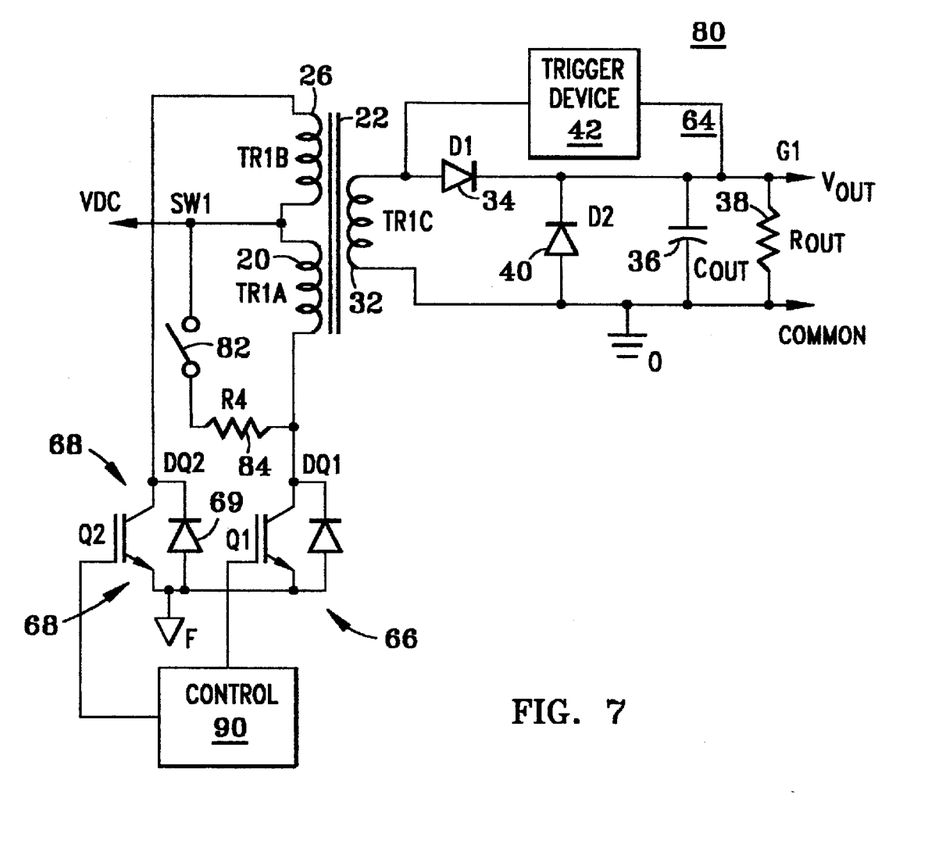
FIG. 7 schematically illustrates an alternative exemplary embodiment of the present invention including primary-side circuitry for avoiding excessive residual output voltage build-up.

FIG. 7 illustrates an exemplary circuit 80 and control 90 that avoids the aforementioned excessive output voltage build-up. In particular, a switch 82 and a resistor 84 (R4) are coupled to the primary windings (i.e., on the low voltage side) of transformer 22.

Figure 8:
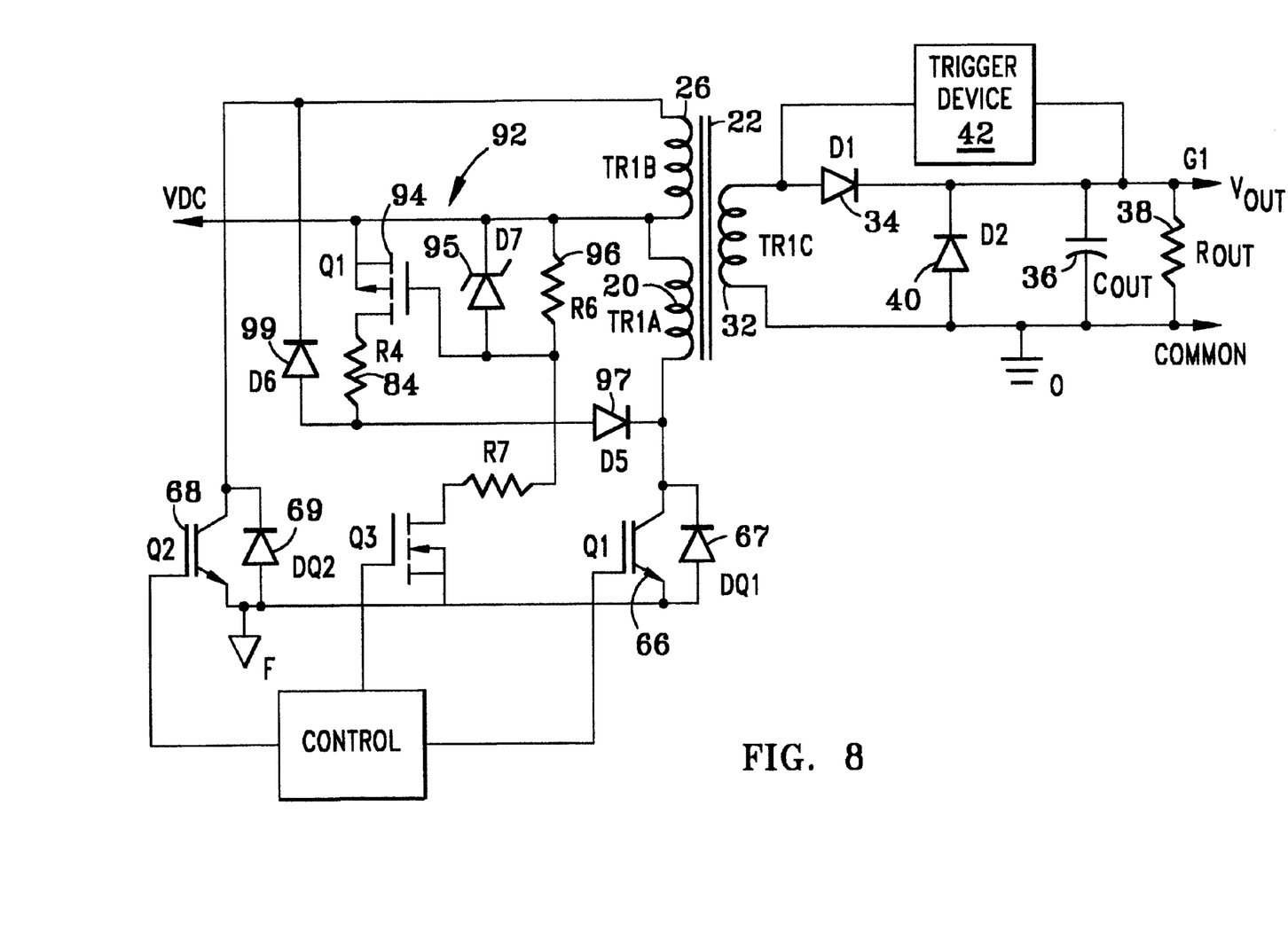
FIG. 8 schematically illustrates a power converter including an exemplary implementation of the primary-side circuitry of FIG. 7.

FIG. 8 illustrates an exemplary implementation of the circuit of FIG. 7 for avoiding exceessive residual voltage build-up, e.g., for keeping such voltage build-up to a value under about 0.5% of the nominal output voltage. In order to switch in resistor 84 (R4) on the primary side, an AC switch 92 is used. Switch 92 is illustrated as comprising a semiconductor switching device 94 (Q4) with a Zener diode 95 and a resistor 96 connected between the gate and source of device Q4. Switching device 98 (Q3) is provided as an interface to a command signal referenced to ground such that applying a gating signal to device Q3 activates device Q4 to switch in resistor R4 across the primary winding, thereby circumventing the body diode of device Q1. Diode D5 (97) is provided to ensure that the discharge path through switch Q4 and resistor R4 is conducting during the relatively narrow portion of time that Vout goes negative. Diode D6 (97) is provided to circumvent the body diode of switching device Q4.

In operation, the added primary-side circuit of FIG. 7 provides a path for discharge of the stored energy in the transformer through the switched-in resistor R4, thereby avoiding charging the output capacitor and excessive output voltage build-up. The added primary-side path is activated by closing switch 92 when the output voltage falls to zero. For complete discharge of the energy stored in the transformer parasitic impedances via the added primary resistive loop, the minimum conduction time of the switch 92 is determined by the time constant of the transformer magnetizing inductance (Lm) and the added resistor R4 (e.g., a minimum of 3·Lm/R4).

The selection of the resistance value R4 involves a trade-off between the output voltage turn-off time and the maximum acceptable output residual voltage. Choosing a higher resistance can shorten the discharge time, but also will increase the voltage across the winding and that, in turn, would lead to a higher residual output voltage.

Figure 9:
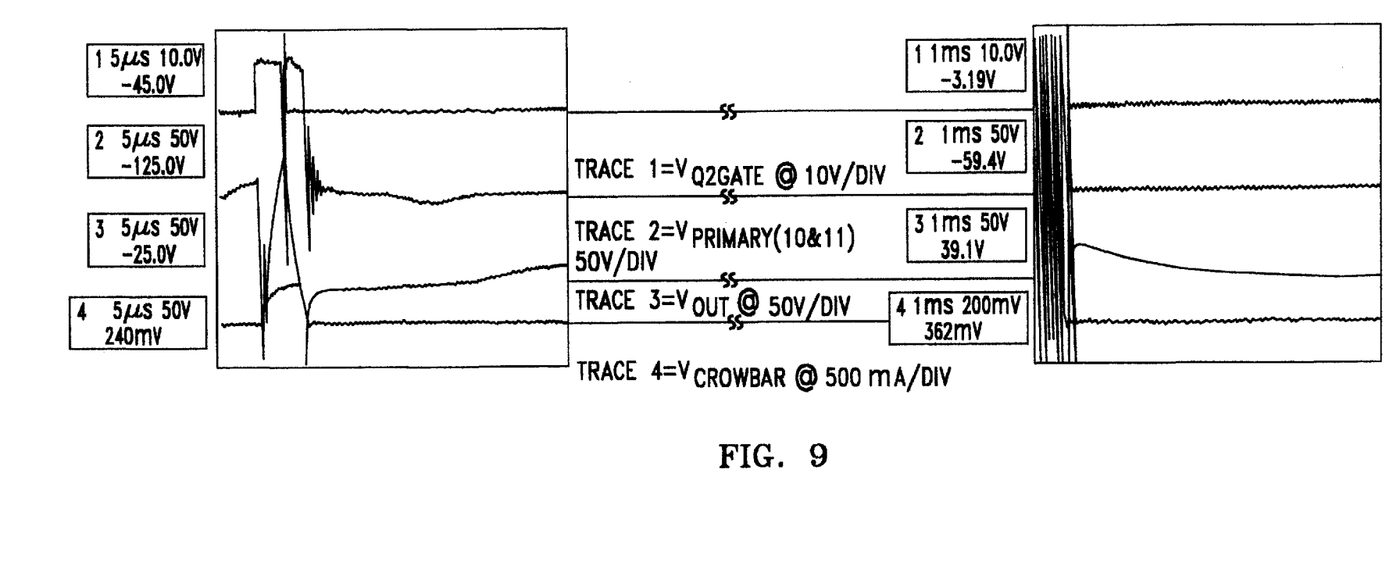
FIG. 9 graphically illustrates operational waveforms for an exemplary embodiment of the circuit of FIG. 2.
Figure 10:
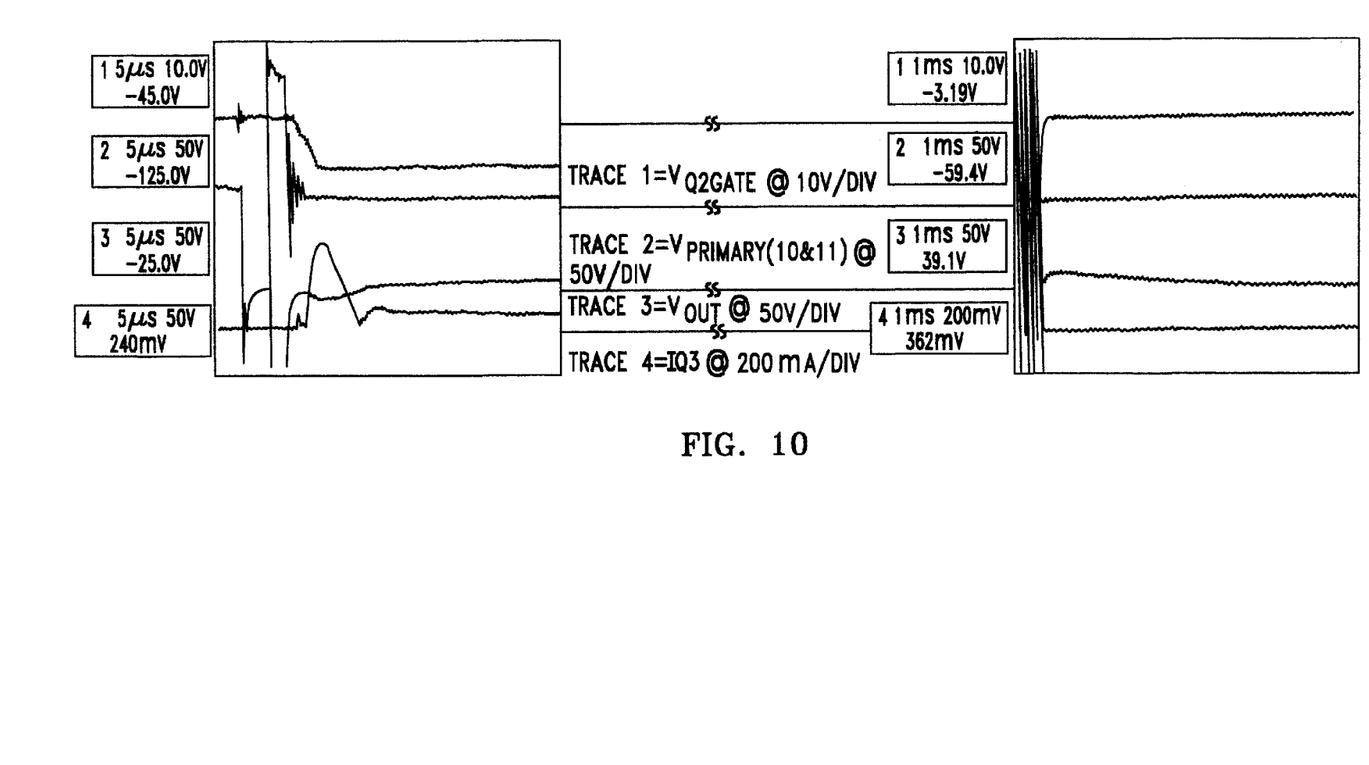
FIG. 10 graphically illustrates operational waveforms for an exemplary embodiment of the circuit of FIG. 8.

FIG. 9 graphically illustrates operational waveforms for an exemplary embodiment of the circuit of FIG. 2, i.e., without the additional primary-side circuit; and, for comparison, FIG. 10 graphically illustrates operational waveforms for an exemplary embodiment of the circuit of FIG. 8, i.e., with the additional primary-side circuit.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A power supply circuit, comprising:
a converter having an input converter stage comprising first and second switching devices in a push-pull configuration, the first switching device being coupled to a primary winding of an isolation transformer, the isolation transformer comprising and a least one secondary winding for coupling the input converter stage to an output converter stage, the output stage comprising an output capacitor and a crowbar circuit, the transformer comprising parasitic impedances comprising a winding capacitance, a leakage inductance and a magnetizing inductance, the crowbar circuit comprising a trigger device, the crowbar circuit being connected between the transformer secondary winding and the output capacitor such that the voltage across the crowbar circuit comprises the superposition of the voltage across the output capacitor and the voltage across the secondary winding of the transformer; and
a control for operating the converter as a forward converter by switching on and off the first switching device in an output-voltage-on mode, and for switching on the second switching device in order to create a reverse voltage pulse on the transformer to activate the trigger device for operation in an output-voltage-off mode such that the output capacitor discharges through the crowbar circuit, the control providing a gating signal to the second switching device sufficient to activate the trigger device by achieving its breakover voltage in a predetermined time equal to a fraction of a resonant period determined by the winding capacitance and leakage inductance of the transformer, the gating signal to the second switching device further being sufficient to discharge the output capacitor in another predetermined time equal to a fraction of another resonant period determined by the transformer leakage inductance and the output capacitor.

2. The power supply circuit of claim 1 wherein the predetermined time for activation of the trigger device is greater than or equal to about one-quarter of the resonant period determined by the winding capacitance and leakage inductance of the transformer.

3. The power supply circuit of claim 1 wherein the predetermined time for discharge of the output capacitor is greater than or equal to about one-quarter of the resonant period of the resonant discharge circuit.

4. The power supply circuit of claim 1 wherein the first and second switching devices comprise switching devices having integral, ultra-fast anti-parallel diodes.

5. The power supply circuit of claim 4 wherein the first and second switching devices comprise IGBT's.

6. The power supply circuit of claim 1 wherein the trigger device comprises at least one SIDAC.

7. The power supply circuit of claim 1, further comprising an additional primary-side circuit for avoiding residual output voltage build-up above a predetermined threshold.

8. The power supply circuit of claim 7 wherein the additional primary-side circuit comprises a series circuit connection of a switch and a resistance, the series connection being coupled to a primary winding of the transformer to provide a path for discharge of energy stored in the transformer after discharge of the output capacitor is complete.

9. The power supply circuit of claim 8 wherein the switch comprises an AC switch having a duty cycle determined by values of the transformer magnetizing inductance and the resistance.

10. The power supply circuit of claim 8 wherein the additional primary-side circuit comprises diode circuitry for ensuring turn on of the switch when the output voltage reaches zero.

11. The power supply circuit of claim 1, further comprising protective circuitry for protecting the output capacitor from a reverse charge build-up during the voltage-off mode.

12. The power supply circuit of claim 11 wherein the protective circuitry comprises a diode coupled in anti-parallel with the output capacitor.

* * * * *